United States Patent
Yamasaki et al.

(10) Patent No.: US 6,842,852 B1
(45) Date of Patent: Jan. 11, 2005

(54) SYSTEM AND METHOD FOR CONTROLLING CONDITIONAL BRANCHING UTILIZING A CONTROL INSTRUCTION HAVING A REDUCED WORD LENGTH

(75) Inventors: Masayuki Yamasaki, Osaka (JP); Minoru Okamoto, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/500,086

(22) Filed: Feb. 8, 2000

(30) Foreign Application Priority Data

Feb. 8, 1999 (JP) .......................................... 11-029568

(51) Int. Cl.[7] .............................................. G06F 15/00
(52) U.S. Cl. ...................... 712/226; 712/221; 712/223; 712/227; 712/233; 712/234
(58) Field of Search ................................ 712/226, 221, 712/223, 227, 233, 234

(56) References Cited

U.S. PATENT DOCUMENTS

| | | | | |
|---|---|---|---|---|
| 4,514,804 A | * | 4/1985 | Kimoto ...................... | 712/233 |
| 5,371,862 A | | 12/1994 | Suzuki et al. | |
| 5,574,927 A | * | 11/1996 | Scantlin ...................... | 703/23 |
| 5,724,565 A | * | 3/1998 | Dubey et al. ............... | 712/200 |
| 5,815,695 A | | 9/1998 | James et al. | |
| 5,930,158 A | * | 7/1999 | Hoge .......................... | 708/204 |

FOREIGN PATENT DOCUMENTS

| | | |
|---|---|---|
| EP | 0 992 891 A1 | 4/2000 |
| JP | 62-262140 | 11/1987 |
| JP | 4-369727 | 12/1992 |
| JP | 7-175650 | 7/1995 |
| JP | 7-253882 | 10/1995 |
| JP | 10-49368 | 2/1998 |
| WO | WO 99/01814 | 1/1999 |

OTHER PUBLICATIONS

Enterprise Systems Architecture/390 Principles of Operation, IBM, 1990, Chapter 7, pp. 7–1 to 7–22 and Appendix A, pp. A–6 to A–13.*
Branch with Execute and Skip Instruction, Research Disclosure, Kenneth Mason Publications, Emsworth, GB, No. 328, Aug. 1, 1991, p. 614, XP000217925.
David A. Patterson et al., "Computer Organization & Design: the hardware/software interface", Morgan Kaufmann Publishers, Inc., pp. 496–504, 1998.

* cited by examiner

*Primary Examiner*—Fritz Fleming
*Assistant Examiner*—Justin Knapp
(74) *Attorney, Agent, or Firm*—McDermott Will & Emery LLP

(57) ABSTRACT

An execution control instruction is applied to an information processor of the type processing instructions by pipelining to suppress the occurrence of branch hazard. The execution control instruction contains: a condition field for specifying an execution condition; and an instruction-specifying field for defining, in binary code, the number of instructions to be executed only conditionally. In response to the execution control instruction, a nullification controller decides, based on control flags provided from an arithmetic logic unit, whether or not the execution condition specified by the condition field is satisfied. And based on the outcome of this decision, the controller determines whether or not that number of instructions, which has been defined by the instruction-specifying field for instructions succeeding the execution control instruction, should be nullified. If the controller has determined that the specified number of succeeding instructions should be nullified since the execution condition is not met, then the controller asserts a nullification signal to be supplied to the arithmetic logic unit. In this manner, a large number of succeeding instructions are executable conditionally using an execution control instruction of a short word length.

14 Claims, 12 Drawing Sheets

EXECUTION CONTROL INSTRUCTION

IF EC IS NOT MET (F1=0)
    EXECUTION CONTROL INSTRUCTION F1,4
    NOP
    NOP
    NOP
    NOP
    SUCCEEDING INSTRUCTION 5

IF EC IS MET (F1=1)
    EXECUTION CONTROL INSTRUCTION F1,4
    SUCCEEDING INSTRUCTION 1
    SUCCEEDING INSTRUCTION 2
    SUCCEEDING INSTRUCTION 3
    SUCCEEDING INSTRUCTION 4
    SUCCEEDING INSTRUCTION 5

IF EC IS NOT MET (F1=0)
    EXECUTION CONTROL INSTRUCTION F1,2
    NOP
    NOP
    SUCCEEDING INSTRUCTION 3
    SUCCEEDING INSTRUCTION 4
    SUCCEEDING INSTRUCTION 5

IF EC IS MET (F1=1)
    EXECUTION CONTROL INSTRUCTION F1,2
    SUCCEEDING INSTRUCTION 1
    SUCCEEDING INSTRUCTION 2
    NOP
    NOP
    SUCCEEDING INSTRUCTION 5

IF EC IS NOT MET (F1=0)

EXECUTION CONTROL INSTRUCTION F1, 1, 3
    NOP
    SUCCEEDING INSTRUCTION 2
    SUCCEEDING INSTRUCTION 3
    SUCCEEDING INSTRUCTION 4
    SUCCEEDING INSTRUCTION 5

IF EC IS MET (F1=1)

EXECUTION CONTROL INSTRUCTION F1, 1, 3
    SUCCEEDING INSTRUCTION 1
    NOP
    NOP
    NOP
    SUCCEEDING INSTRUCTION 5

Fig. 14A

IF NEITHER EC1 NOR EC2 IS MET (WHEN F1=0 AND F2=1)
    EXECUTION CONTROL INSTRUCTION F1,NF2,2
    NOP
    NOP
    NOP
    NOP
    SUCCEEDING INSTRUCTION 5

Fig. 14B

IF EC1 IS NOT MET AND EC2 IS MET (WHEN F1=0 AND F2=0)
    EXECUTION CONTROL INSTRUCTION F1,NF2,2
    NOP
    NOP
    SUCCEEDING INSTRUCTION 3
    SUCCEEDING INSTRUCTION 4
    SUCCEEDING INSTRUCTION 5

Fig. 14C

IF EC1 IS MET AND EC2 IS NOT MET (WHEN F1=1 AND F2=1)
    EXECUTION CONTROL INSTRUCTION F1,NF2,2
    SUCCEEDING INSTRUCTION 1
    SUCCEEDING INSTRUCTION 2
    NOP
    NOP
    SUCCEEDING INSTRUCTION 5

Fig. 14D

IF BOTH EC1 AND EC2 ARE MET (WHEN F1=1 AND F2=0)
    EXECUTION CONTROL INSTRUCTION F1,NF2,2
    SUCCEEDING INSTRUCTION 1
    SUCCEEDING INSTRUCTION 2
    SUCCEEDING INSTRUCTION 3
    SUCCEEDING INSTRUCTION 4
    SUCCEEDING INSTRUCTION 5

Fig. 17A

IF NEITHER EC1 NOR EC2 IS MET (WHEN F1=0 AND F2=1)
    EXECUTION CONTROL INSTRUCTION F1, NF2, 1, 3
    NOP
    NOP
    NOP
    NOP
    SUCCEEDING INSTRUCTION 5

Fig. 17B

IF EC1 IS NOT MET AND EC2 IS MET (WHEN F1=0 AND F2=0)
    EXECUTION CONTROL INSTRUCTION F1, NF2, 1, 3
    NOP
    SUCCEEDING INSTRUCTION 2
    SUCCEEDING INSTRUCTION 3
    SUCCEEDING INSTRUCTION 4
    SUCCEEDING INSTRUCTION 5

Fig. 17C

IF EC1 IS MET AND EC2 IS NOT MET (WHEN F1=1 AND F2=1)
    EXECUTION CONTROL INSTRUCTION F1, NF2, 1, 3
    SUCCEEDING INSTRUCTION 1
    NOP
    NOP
    NOP
    SUCCEEDING INSTRUCTION 5

Fig. 17D

IF BOTH EC1 AND EC2 ARE MET (WHEN F1=1 AND F2=0)
    EXECUTION CONTROL INSTRUCTION F1, NF2, 1, 3
    SUCCEEDING INSTRUCTION 1
    SUCCEEDING INSTRUCTION 2
    SUCCEEDING INSTRUCTION 3
    SUCCEEDING INSTRUCTION 4
    SUCCEEDING INSTRUCTION 5

SYSTEM AND METHOD FOR CONTROLLING CONDITIONAL BRANCHING UTILIZING A CONTROL INSTRUCTION HAVING A REDUCED WORD LENGTH

BACKGROUND OF THE INVENTION

The present invention relates to controlling the execution of a program in an information processor for processing instructions by pipelining.

In an information processor such as microprocessor or digital signal processor (DSP) for executing instructions by pipeline processing, a pipeline hazard resulting from conditional branching, i.e., a branch hazard, will happen. Particularly when there is a great number of pipeline stages, the branch hazard causes a serious problem.

To minimize the issuance of conditional branch instructions, conditionally executable instructions are adoptable effectively. For example, according to the technique disclosed in Japanese Laid-Open Publication No. 10-49368, each conditionally executable instruction contains a condition field specifying its own execution condition. That is to say, the instruction is selectively executed depending on whether or not the execution condition specified by its own condition field is satisfied. This technique is hard to apply to an information processor of the type using a short instruction word length, because each instruction to be executed by the processor cannot afford including such an additional condition field.

As for the short-word-length information processor, an instruction issued exclusively to control the conditional execution of succeeding instructions, i.e., an execution control instruction, is applicable effectively. For instance, according to the technique disclosed in Japanese Laid-Open Publication No. 7-253882, the execution control instruction contains a condition field specifying multiple registers. The number of registers specified in the condition field is always equal to the number of instructions, which succeed the execution control instruction and will be executed under controlled conditions, and is a fixed number. And it is determined based on the value of each of these registers whether or not a succeeding instruction corresponding to the register should be executed. As a result, conditional branch instructions do not have to be used so frequently.

According to the technique disclosed in the latter publication, however, if the number of instructions to be executed under controlled conditions should be increased, then the number of registers specified in the condition field of the execution control instruction has to be increased. As a result, the length of each instruction word must be increased unintentionally. Thus, the short-word-length information processor cannot control the conditional execution of so many succeeding instructions using the execution control instruction.

SUMMARY OF THE INVENTION

An object of the present invention is controlling the conditional execution of as many succeeding instructions as possible using an execution control instruction of a short word length to suppress the branch hazard in an information processor for processing the instructions by pipelining.

To achieve this object, the present invention introduces an instruction-specifying field, which is used to define, in binary code, the number of instructions that should be executed under controlled conditions, into the execution control instruction.

More specifically, the present invention uses an execution control instruction, which contains: a condition field specifying an execution condition; and an instruction-specifying field defining, in binary code, the number of instructions to be executed only conditionally. A decision is made as to whether or not the execution condition that has been specified by the condition field is satisfied. Based on the outcome of this decision, it is determined whether or not that number of instructions, which has been defined by the instruction-specifying field for instructions succeeding the execution control instruction, should be nullified.

BRIEF DESCRIPTION OF THE DRAWINGS

FIGS. 14A, 14B, 14C and 14D illustrate specific examples of the program execution control according to the fourth embodiment.

FIGS. 17A, 17B, 17C and 17D illustrate specific examples of the program execution control according to the fifth embodiment.

DETAILED DESCRIPTION OF THE INVENTION

Figure 1:
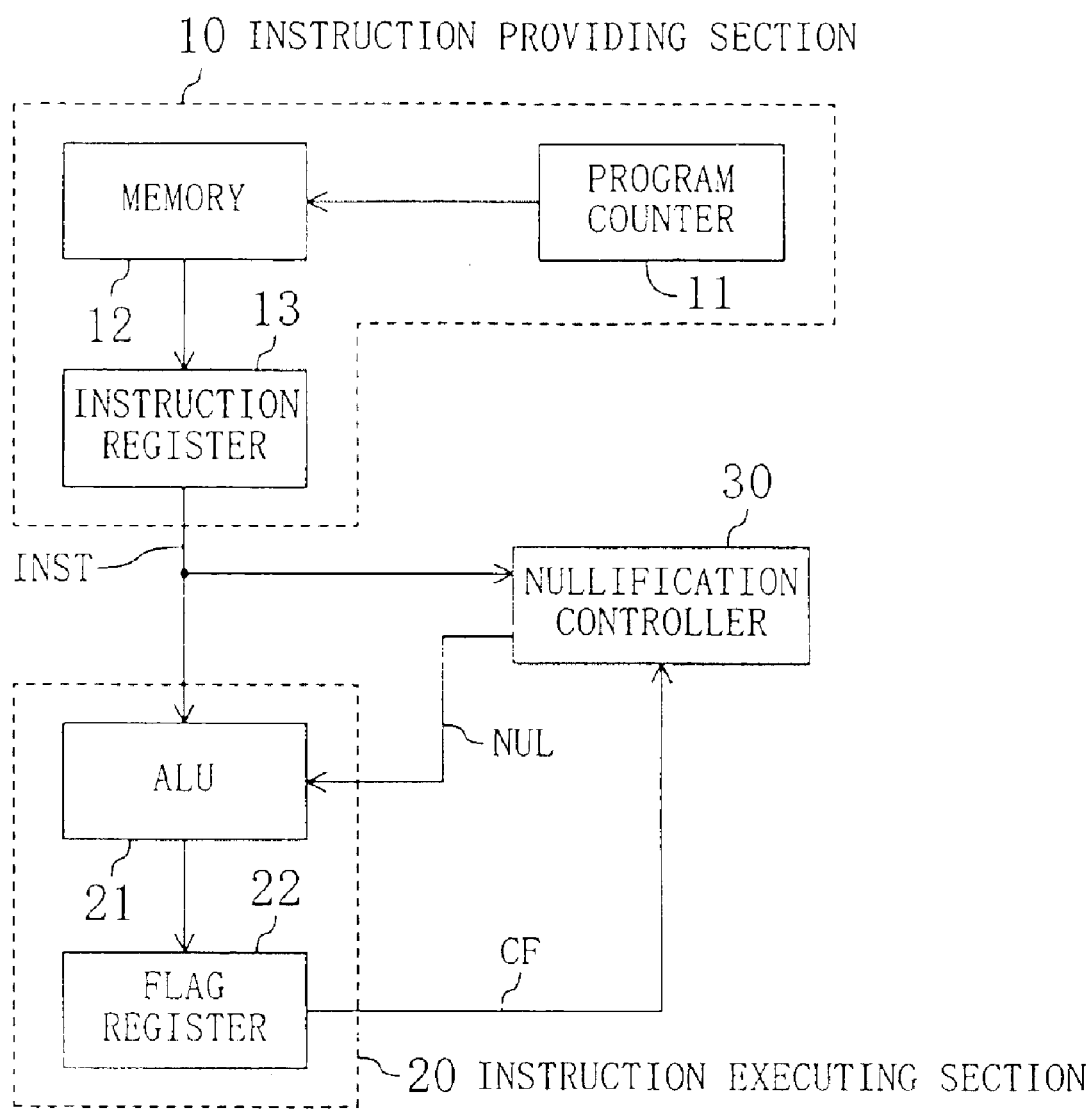
FIG. 1 is a block diagram schematically illustrating an exemplary configuration for a program execution control system according to the present invention.

FIG. 1 schematically illustrates an exemplary configuration for a program execution control system according to the present invention. The system shown in FIG. 1 is used for controlling the execution of a program in an information processor of the type processing instructions by pipelining. As shown in FIG. 1, the system includes instruction providing section 10, instruction executing section 20 and nullification controller 30. The instruction providing section 10 includes program counter 11, memory 12 and instruction register 13. The program counter 11 sequentially specifies respective addresses of instructions to be fetched and executed. The memory 12 reads out the instructions, which together constitute a program (i.e., instruction set) including an execution control instruction, one after another in accordance with the addresses specified. And the instruction register 13 stores thereon the instructions read out one by one. An instruction set INST is provided from the instruction register 13 to the instruction executing section 20 and to the nullification controller 30. The instruction executing section 20 includes: an arithmetic logic unit (ALU) 21 for performing arithmetic or logic operations in response to the instruction set INST provided; and a flag register 22 for holding multiple flags indicating the results of the computations. The nullification controller 30 receives control flags CF from the flag register 22. In the illustrated embodiment, the control flags CF include two flags F1 and F2, which have been set equal to zero or one by the ALU 21.

Figure 2:
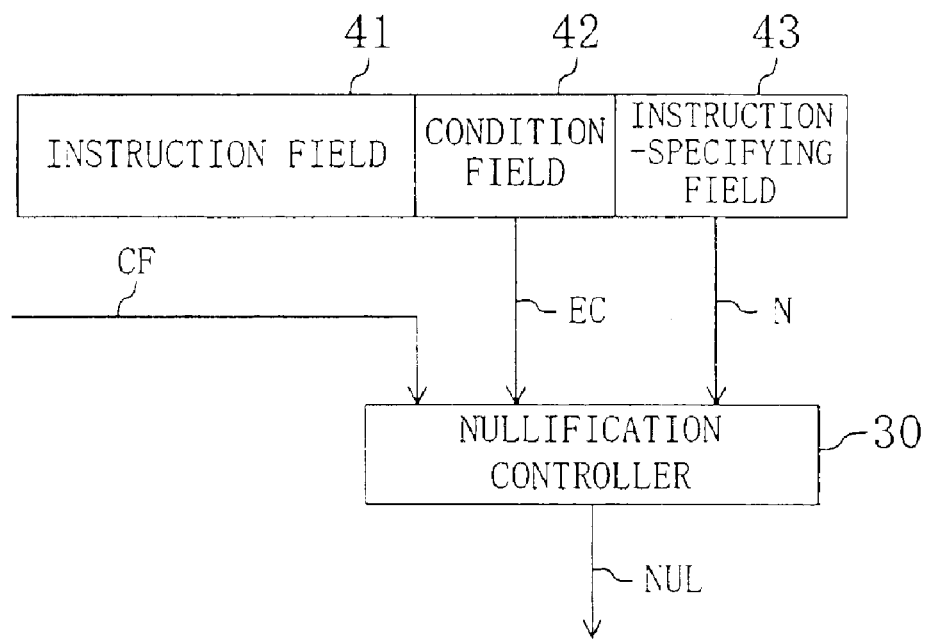
FIG. 2 illustrates a basic format for an execution control instruction according to the present invention.

FIG. 2 illustrates a basic format for an execution control instruction according to the present invention. As shown in FIG. 2, the execution control instruction contains instruction field 41, condition field 42 and instruction-specifying field 43. The instruction field 41 specifies the type of the instruction as an execution control instruction. The condition field 42 specifies an execution condition EC. And the instruction-specifying field 43 defines, in binary code, the number N (where N is a natural number) of instructions that will be executed only conditionally, i.e., just when the execution condition EC is satisfied. In response to the execution control instruction, the nullification controller 30 decides based on the control flags CF whether or not the execution condition EC specified by the condition field 42 is met. And based on the outcome of this decision, the nullification controller 30 determines whether or not the number N of instructions, which number has been defined by the instruction-specifying field 43 as the number of instructions succeeding the execution control instruction, should be nullified. Suppose the nullification controller 30 has determined that the number N of instructions should be nullified since the execution condition EC is not met, the controller 30 asserts a nullification signal NUL to be supplied to the ALU 21. In that case, even if the number N of instructions following the execution control instruction have already been executed to a midway point of the pipeline, these instructions are nullified in the ALU 21. Accordingly, the same results are attained as if NOP (no operation) instructions had been executed instead of these instructions. Alternatively, if the nullification controller 30 has determined that the number N of succeeding instructions should not be nullified since the execution condition EC is met, then the nullification signal NUL is not asserted. Thus, the number N of instructions succeeding the execution control instruction are enabled and executed by the ALU 21.

Embodiment 1

Figure 3:
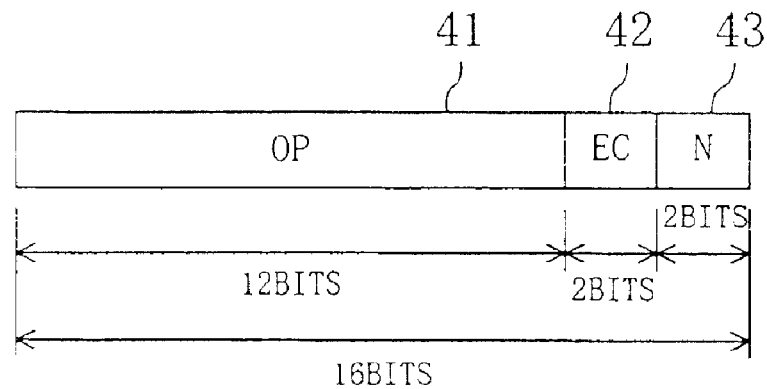
FIG. 3 illustrates a format for an execution control instruction according to a first embodiment of the present invention.

FIG. 3 illustrates a 16-bit format of an execution control instruction according to a first embodiment of the present invention. As shown in FIG. 3, the execution control instruction contains a 12-bit instruction field 41, a 2-bit condition field 42 and a 2-bit instruction-specifying field 43. The instruction field 41 sets an operation code OP specifying the instruction type of the operation to be performed, i.e., execution control instruction. The condition field 42 specifies any of four types of execution conditions. In the illustrated embodiment, the execution condition EC to be specified is a binary code representing "F1=1", "F1=0", "F2=1" or "F2=0". The instruction-specifying field 43 specifies, in binary code, the number N (where N=1 through 4) of instructions that will be executed under controlled conditions. In the illustrated embodiment, codes "00", "01", "10" and "11" represent "N=1", "N=2", "N=3" and "N=4", respectively.

Figure 4:
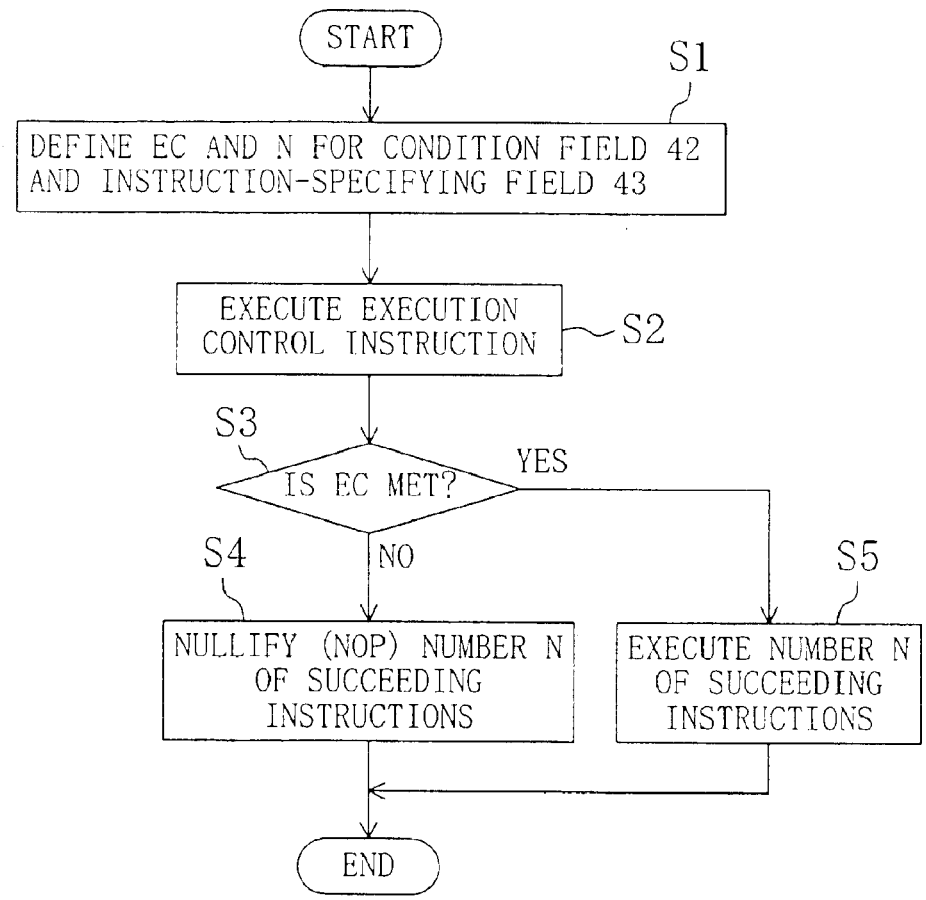
FIG. 4 is a flowchart illustrating a program execution control procedure according to the first embodiment.

FIG. 4 illustrates a program execution control procedure according to the first embodiment. First, in Step S1, the execution condition EC and the number N of instructions to be executed under controlled conditions are defined for the condition field 42 and instruction-specifying field 43, respectively. Next, in Step S2, the execution control instruction is executed. Then, in Step S3, it is determined based on the control flags CF whether or not the execution condition EC is satisfied. If the execution condition EC is not met, then the number N of instructions succeeding the execution control instruction are nullified in Step S4. Alternatively, if the execution condition EC is met, then the number N of instructions following the execution control instruction are executed in Step S5.

Figures 5A, 5B, 6:
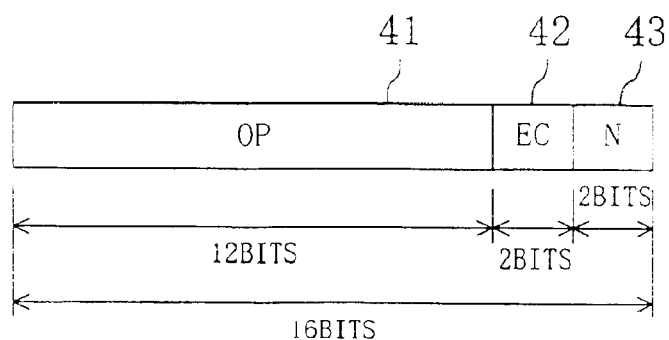
FIGS. 5A and 5B illustrate specific examples of the program execution control according to the first embodiment.
FIG. 6 illustrates a format for an execution control instruction according to a second embodiment of the present invention.

FIGS. 5A and 5B illustrate specific examples of the program execution control according to the first embodiment. In the illustrated examples, "F1=1" is the execution condition EC and "N=4". As shown in FIG. 5A, if the execution condition is not met (i.e., when F1=0), then the four instructions succeeding the execution control instruction (i.e., Succeeding Instructions 1 through 4) are nullified. On the other hand, if the execution condition is met (i.e., when F1=1), then the four instructions following the execution control instruction (i.e., Succeeding Instructions 1 through 4) are executed, not nullified, as shown in FIG. 5B.

In the first embodiment, the number of bits in the condition field 42 is two. Optionally, the number of execution conditions may be increased by increasing this bit number. The number of bits in the instruction-specifying field 43 is also two in the first embodiment. Alternatively, the number of instructions to be executed under controlled conditions may be increased by increasing this bit number. These modified examples will be equally applicable to all of the following second through fifth embodiments.

Embodiment 2

FIG. 6 illustrates a 16-bit format for an execution control instruction according to a second embodiment of the present invention. The format shown in FIG. 6 is the same as that shown in FIG. 3.

Figure 7:
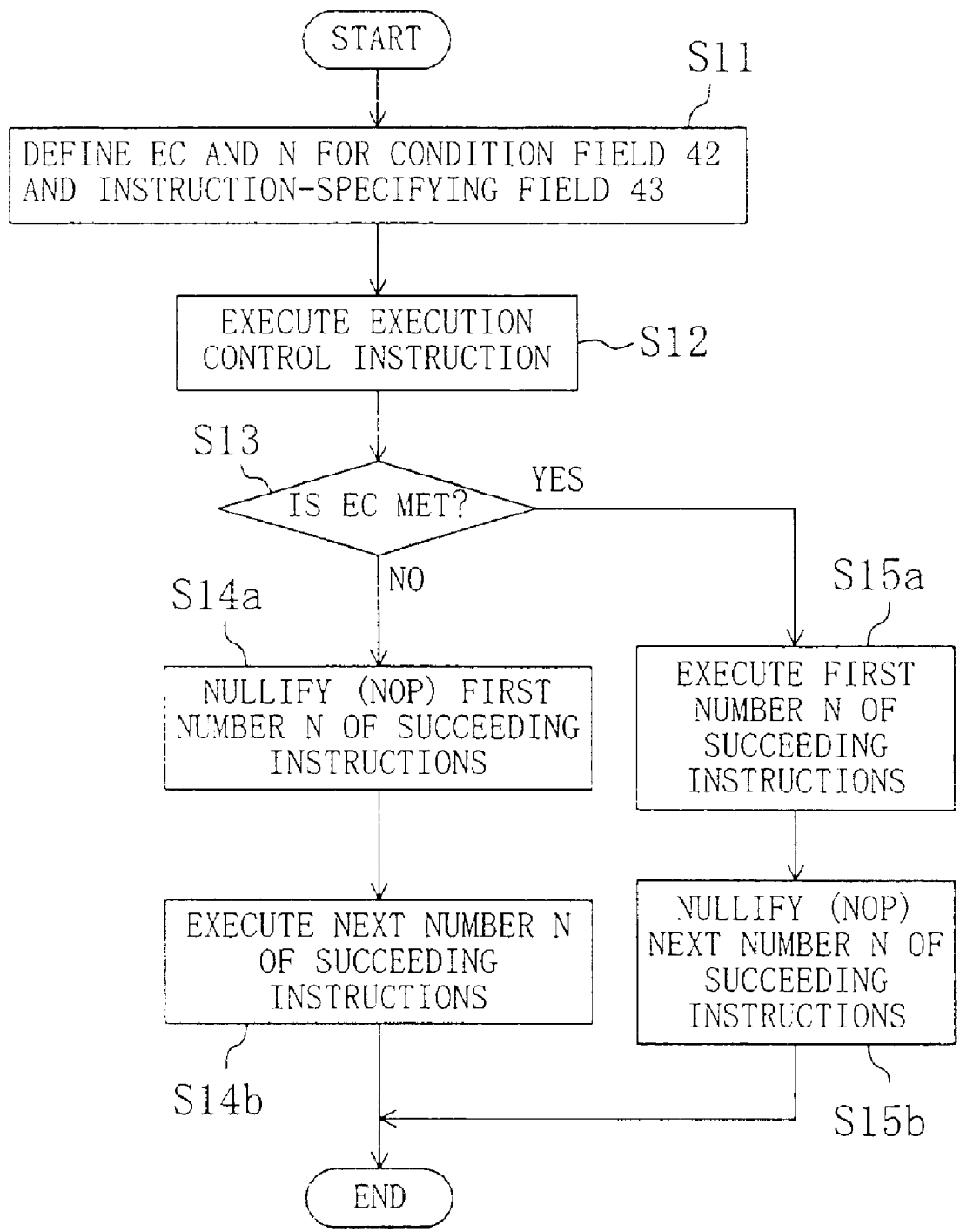
FIG. 7 is a flowchart illustrating a program execution control procedure according to the second embodiment.

FIG. 7 illustrates a program execution control procedure according to the second embodiment. First, in Step S11, the execution condition EC and the number N of instructions to be executed under controlled conditions are defined for the condition field 42 and instruction-specifying field 43, respectively. Next, in Step S12, the execution control instruction is executed. Then, in Step S13, it is determined based on the control flags CF whether or not the execution condition EC is satisfied. If the execution condition EC is not met, then the number N of instructions succeeding the execution control instruction are nullified in Step S14a. Thereafter, the next number N of instructions following the former instruction set are executed in Step S14b. Alternatively, if the execution condition EC is met, then the number N of instructions succeeding the execution control instruction are executed in Step S15a. Thereafter, the next number N of instructions following the former instruction set are nullified in Step S15b.

Figures 8A, 8B, 9:
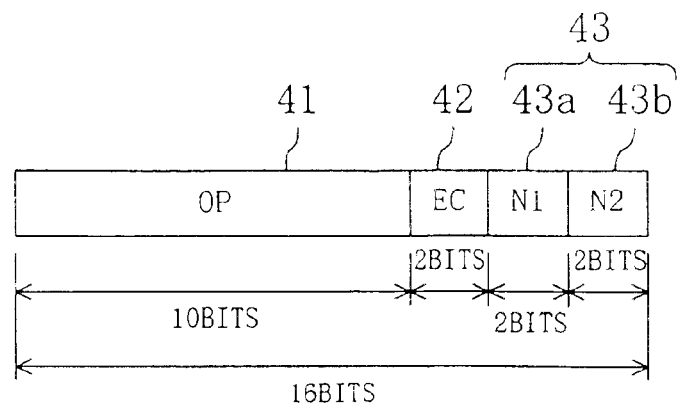
FIGS. 8A and 8B illustrate specific examples of the program execution control according to the second embodiment.
FIG. 9 illustrates a format for an execution control instruction according to a third embodiment of the present invention.

FIGS. 5A and 8B illustrate specific examples of the program execution control according to the second embodiment. In the illustrated examples, "F=1" is the execution condition EC and "N=2". As shown in FIG. 8A, if the execution condition is not met (i.e., when F1=0), then the first two instructions succeeding the execution control instruction (i.e., Succeeding Instructions 1 and 2) are nullified, and the next two instructions (i.e., Succeeding Instructions 3 and 4) are executed. On the other hand, if the execution condition is met (i.e., when F1=1), then the first two instructions following the execution control instruction (i.e., Succeeding Instructions 1 and 2) are executed, and the next two instructions (i.e., Succeeding Instructions 3 and 4) are nullified as shown in FIG. 8B. That is to say, according to this embodiment, instructions can be executed conditionally in accordance with the if-then-else construct.

Embodiment 3

FIG. 9 illustrates a 16-bit format for an execution control instruction according to a third embodiment of the present invention. As shown in FIG. 9, the execution control instruction contains a 10-bit instruction field 41, a 2-bit condition field 42 and a 4-bit instruction-specifying field 43. The instruction field 41 defines an operation code OP specifying the instruction type of the operation to be performed, i.e., execution control instruction. The condition field 42 specifies any of four types of execution conditions. The instruction-specifying field 43 consists of first and second instruction-specifying sub-fields 43a and 43b, each defining, in binary code, the number of instructions that will be executed only conditionally. The first instruction-specifying sub-field 43a is a 2-bit field for defining, in binary code, the first number N1 (where N1=1 through 4) of instructions to be executed under controlled conditions. The second instruction-specifying sub-field 43b is also a 2-bit field for defining, in binary code, the second number N2 (where N2=1 through 4) of instructions to be executed under controlled conditions.

Figure 10:
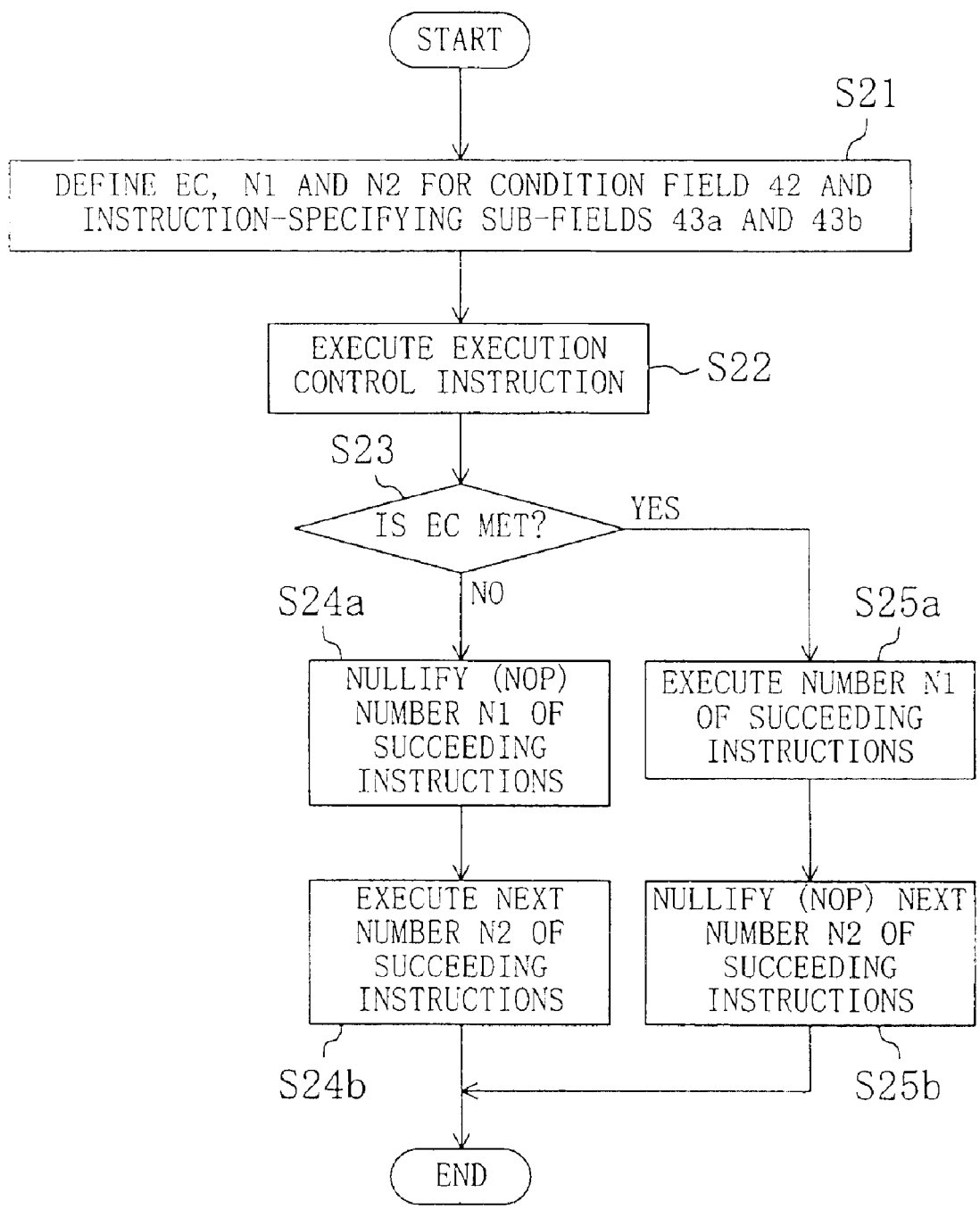
FIG. 10 is a flowchart illustrating a program execution control procedure according to the third embodiment.

FIG. 10 illustrates a program execution control procedure according to the third embodiment. First, in Step S21, the execution condition EC and the first and second numbers N1 and N2 of instructions to be executed under controlled conditions are defined for the condition field 42 and instruction-specifying sub-fields 43a and 43b, respectively. Next, in Step S22, the execution control instruction is executed. Then, in Step S23, it is determined based on the control flags CF whether or not the execution condition EC is satisfied. If the execution condition EC is not met, then the first number N1 of instructions succeeding the execution control instruction are nullified in Step S24a. Thereafter, the second number N2 of instructions following the first instruction set are executed in Step S24b. Alternatively, if the execution condition EC is met, then the first number N1 of instructions succeeding the execution control instruction are executed in Step S25a. Thereafter, the second number N2 of instructions following the first instruction set are nullified in Step S25b.

Figures 11A, 11B, 12:
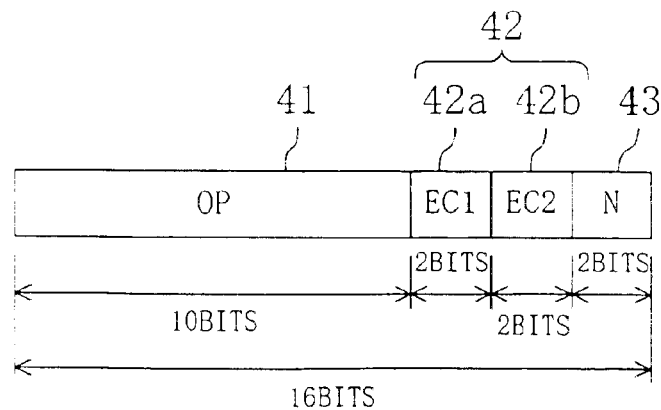
FIGS. 11A and 11B illustrate specific examples of the program execution control according to the third embodiment.
FIG. 12 illustrates a format for an execution control instruction according to a fourth embodiment of the present invention.

FIGS. 11A and 11B illustrate specific examples of the program execution control according to the third embodiment. In the illustrated examples, "F1=1" is the execution condition EC, "N1=1" and "N2=3". As shown in FIG. 11A, if the execution condition is not met (i.e., when F1=0), then the first instruction succeeding the execution control instruction (i.e., Succeeding Instruction 1) is nullified, and the next three instructions (i.e., Succeeding Instructions 2, 3 and 4) are executed. On the other hand, if the execution condition is met (i.e., when F1=1), then the first instruction following the execution control instruction (i.e., Succeeding Instruction 1) is executed, and the next three instructions (i.e., Succeeding Instructions 2, 3 and 4) are nullified as shown in FIG. 11B. That is to say, according to this embodiment, instructions can be executed conditionally in accordance with the if-then-else construct. In addition, the respective numbers of instructions corresponding to the THEN and ELSE statements can be defined independently.

Embodiment 4

FIG. 12 illustrates a 16-bit format for an execution control instruction according to a fourth embodiment of the present invention. As shown in FIG. 12, the execution control instruction contains a 10-bit instruction field 41, a 4-bit condition field 42 and a 2-bit instruction-specifying field 43. The instruction field 41 defines an operation code OP specifying the instruction type of the operation to be performed, i.e., execution control instruction. The condition field 42 consists of first and second condition sub-fields 42a and 42b, each specifying a single execution condition. The first condition sub-field 42a is a 2-bit field for specifying any of four types of execution conditions as a first execution condition EC1. The second condition sub-field 42b is also a 2-bit field for specifying any of four types of execution conditions as a second execution condition EC2. The instruction-specifying sub-field 43 defines, in binary code, the number N (where N=1 through 4) of instructions to be executed under controlled conditions.

Figure 13:
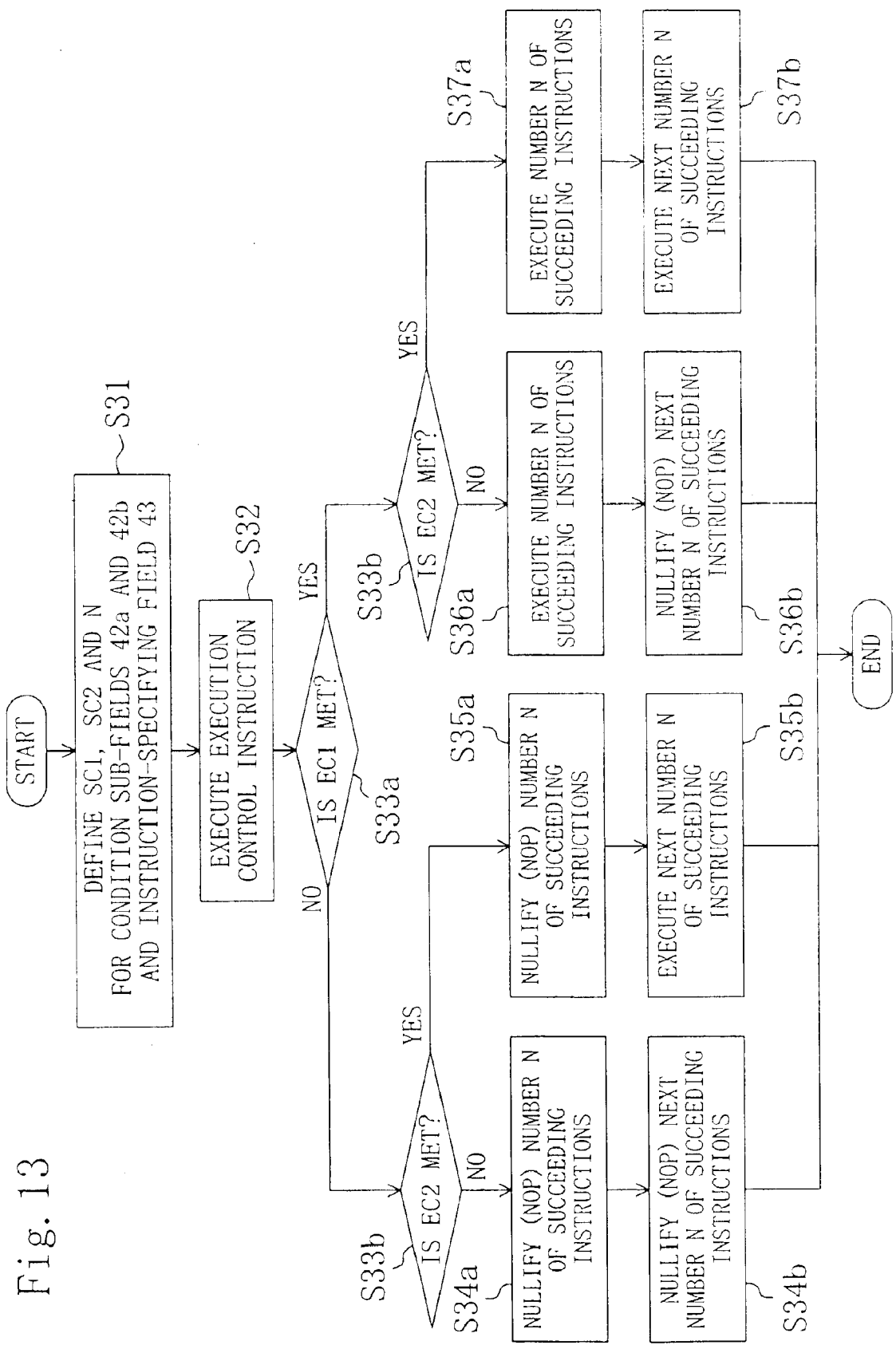
FIG. 13 is a flowchart illustrating a program execution control procedure according to the fourth embodiment.

FIG. 13 illustrates a program execution control procedure according to the fourth embodiment. First, in Step S31, the first and second execution conditions EC1 and EC2 and the number N of instructions to be executed under controlled conditions are defined for the first and second condition sub-fields 42a and 42b and instruction-specifying field 43, respectively. Next, in Step S32, the execution control instruction is executed. Then, in Step S33a, it is determined based on the control flags CF whether or not the first execution condition EC1 is satisfied. Next, in Step S33b, it is determined based on the control flags CF whether or not the second execution condition EC2 is satisfied. If neither the first nor second execution condition EC1 nor EC2 is met, then the number N of instructions succeeding the execution control instruction are nullified in Step S34a. Thereafter, the next number N of instructions succeeding the former instruction set are nullified in Step S34b. Alternatively, if the first execution condition EC1 is not met and the second execution condition EC2 is met, then the number N of instructions succeeding the execution control instruction are nullified in Step S35a. Thereafter, the next number N of instructions succeeding the former instruction set are executed in Step S35b. As another alternative, if the first execution condition EC1 is met and the second execution condition EC2 is not met, then the number N of instructions succeeding the execution control instruction are executed in Step S36a. Thereafter, the next number N of instructions succeeding the former instruction set are nullified in Step S36b. As further alternative, if both the first and second execution conditions EC1 and EC2 are met, then the number N of instructions succeeding the execution control instruction are executed in Step S37a. Thereafter, the next number N of instructions succeeding the former instruction set are executed in Step S37b.

FIGS. 14A through 14D illustrate specific examples of the program execution control according to the fourth embodiment. In the illustrated examples, "F1=1" is the first execution condition EC1, "F2=0" is the second execution condition EC2 and "N=2". As shown in FIG. 14A, if neither the first nor second execution condition is met (i.e., when F1=0 and F2=1), then four instructions succeeding the execution control instruction (i.e., Succeeding Instructions 1 through 4) are nullified. Alternatively, if the first execution condition is not met and the second execution condition is met (i.e., when F1=0 and F2=0), then two instructions succeeding the execution control instruction (i.e., Succeeding Instructions 1 and 2) are nullified and next two instructions succeeding the former instruction set (i.e., Succeeding Instructions 3 and 4) are executed as shown in FIG. 14B. As another alternative, if the first execution condition is met and the second execution condition is not met (i.e., when F1=1and F2=1), then two instructions succeeding the execution control instruction (i.e., Succeeding Instructions 1 and 2) are executed and next two instructions succeeding the former instruction set (i.e., Succeeding Instructions 3 and 4) are nullified as shown in FIG. 14C. As further alternative, if both the first and second execution conditions are met (i.e., when F1=1 and F2=0), then four instructions succeeding the execution control instruction (i.e., Succeeding Instructions 1 through 4) are executed, not nullified, as shown in FIG. 14D.

It should be noted that the number M of condition sub-fields in the execution control instruction may be equal to or larger than three. In such a case, a number N of instructions, which number has been defined by the instruction-specifying field 43 for instructions succeeding the execution control instruction, are regarded as instructions to be executed under controlled conditions. If an execution condition ECm (where m=1 through M), which has been specified by associated one of the number M of condition sub-fields, is not met, then the step of nullifying the number N of instructions at a location corresponding to the specified execution condition ECm is performed. Furthermore, if an execution condition ECm (where m=1 through M), which has been specified by associated one of the number M of condition sub-fields, is met, then the step of executing the number N of instructions at a location corresponding to the specified execution condition ECm is performed.

Embodiment 5

Figure 15:
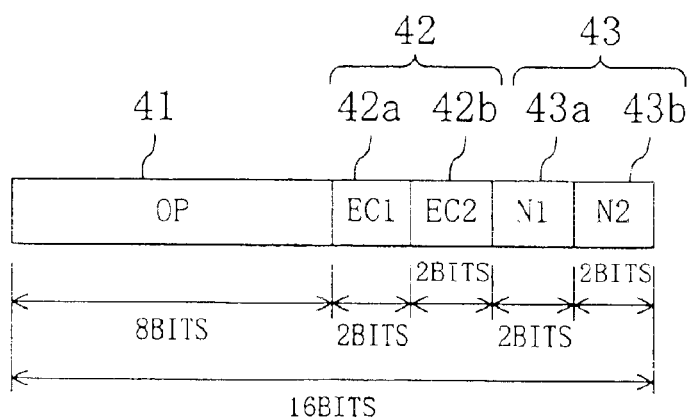
FIG. 15 illustrates a format for an execution control instruction according to a fifth embodiment of the present invention.

FIG. 15 illustrates a 16-bit format for an execution control instruction according to a fifth embodiment of the present invention. As shown in FIG. 15, the execution control instruction contains an 8-bit instruction field 41, a 4-bit condition field 42 and a 4-bit instruction-specifying field 43. The instruction field 41 defines an operation code OP specifying the instruction type of the operation to be performed, i.e., execution control instruction. The condition field 42 consists of first and second condition sub-fields 42a and 42b, each specifying a single execution condition. The first condition sub-field 42a is a 2-bit field for specifying any of four types of execution conditions as a first execution condition EC1. The second condition sub-field 42b is also a 2-bit field for specifying any of four types of execution conditions as a second execution condition EC2. The instruction-specifying field 43 consists of first and second instruction-specifying sub-fields 43a and 43b, each defining, in binary code, the number of conditionally executable instructions. The first instruction-specifying sub-field 43a is a 2-bit field for defining, in binary code, the first number N1 (where N1=1 through 4) of instructions to be executed under controlled conditions. The second instruction-specifying sub-field 43b is also a 2-bit field for defining, in binary code, the second number N2 (where N2 =1 through 4) of instructions to be executed under controlled conditions.

Figure 16:
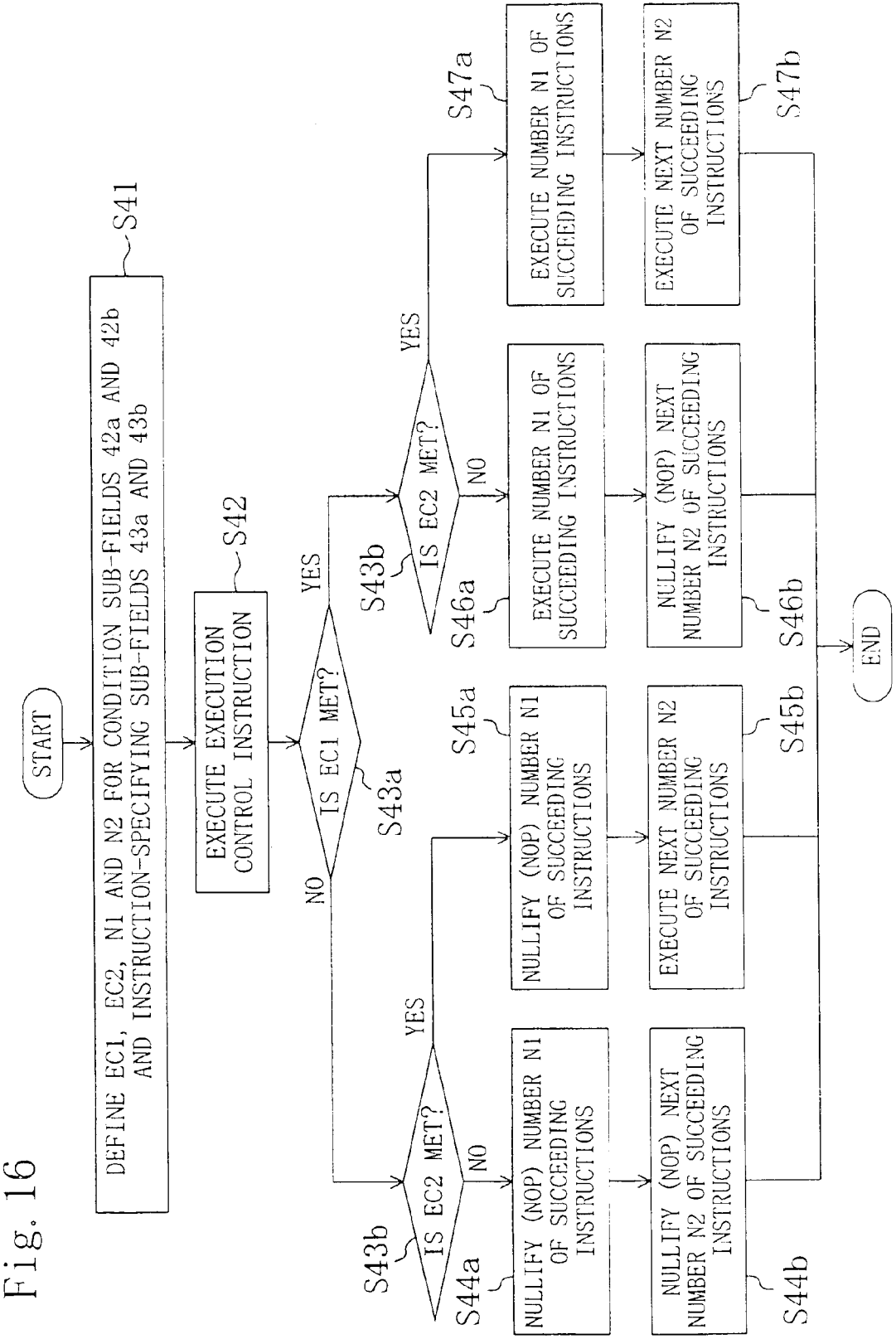
FIG. 16 is a flowchart illustrating a program execution control procedure according to the fifth embodiment.

FIG. 16 illustrates a program execution control procedure according to the fifth embodiment. First, in Step S41, the first and second execution conditions EC1 and EC2 and first and second numbers N1 and N2 of conditionally executable instructions are defined for the first and second condition sub-fields 42a and 42b and first and second instruction-specifying sub-fields 43a and 43b, respectively. Next, in Step S42, the execution control instruction is executed. Then, in Step S43a, it is determined based on the control flags CF whether or not the first execution condition EC1 is satisfied. Next, in Step S43b, it is determined based on the control flags CF whether or not the second execution condition EC2 is satisfied. If neither the first nor second execution condition EC1 nor EC2 is met, then the number N1 of instructions succeeding the execution control instruction are nullified in Step S44a. Thereafter, the next number N2 of instructions succeeding the former instruction set are nullified in Step S44b. Alternatively, if the first execution condition EC1 is not met and the second execution condition EC2 is met, then the number N1 of instructions succeeding the execution control instruction are nullified in Step S45a. Thereafter, the next number N2 of instructions succeeding the former instruction set are executed in Step S45b. As another alternative, if the first execution condition EC1 is met and the second execution condition EC2 is not met, then the number N1 of instructions succeeding the execution control instruction are executed in Step S46a. Thereafter, the next number N2 of instructions succeeding the former instruction set are nullified in Step S46b. As further alternative, if both the first and second execution conditions EC1 and EC2 are met, then the number N1 of instructions succeeding the execution control instruction are executed in Step S47a. Thereafter, the next number N2 of instructions succeeding the former instruction set are executed in Step S47b.

FIGS. 17A through 17D illustrate specific examples of the program execution control according to the fifth embodiment. In the illustrated examples, "F1=1" is the first execution condition EC1, "F2=0" on is the second execution condition EC2, "N1=1" and "N2=3". As shown in FIG. 17A, if neither the first nor second execution condition is met (i.e., when F1=0 and F2=1), then four instructions succeeding the execution control instruction (i.e., Succeeding Instructions 1 through 4) are nullified. Alternatively, if the first execution condition is not met and the second execution condition is met (i.e., when F1=0 and F2=0), then one instruction succeeding the execution control instruction (i.e., Succeeding Instruction 1) is nullified and the next three instructions following the former instruction (i.e., Succeeding Instructions 2, 3 and 4) are executed as shown in FIG. 17B. As another alternative, if the first execution condition is met and the second execution condition is not met (i.e., when F1=1 and F2=1), then one instruction succeeding the execution control instruction (i.e., Succeeding Instruction 1) is executed and the next three instructions succeeding the former instruction (i.e., Succeeding Instructions 2, 3 and 4) are nullified as shown in FIG. 17C. As further alternative, if both the first and second execution conditions are met (i.e., when F1=1 and F2=0), then four instructions succeeding the execution control instruction (i.e., Succeeding Instructions 1 through 4) are executed, not nullified, as shown in FIG. 17D.

It should be noted that the number M of condition sub-fields of the execution control instruction may be equal to or larger than three. In such a case, the same number M of instruction-specifying sub-fields, which correspond to the number M of condition sub-fields, respectively, are included in the instruction-specifying field of the execution control instruction. A number Nm of instructions (where m=1 through M), which number has been defined by associated one of the number M of instruction-specifying sub-fields for instructions succeeding the execution control instruction, are regarded as instructions to be executed under controlled conditions. If an execution condition ECm (where m=1 through M), which is specified by associated one of the number M of condition sub-fields, is not met, then the step of nullifying the number Nm of instructions at a location corresponding to the specified execution condition ECm is performed. Furthermore, if the execution condition ECm (where m=1 through M), which has been specified by associated one of the number M of condition sub-fields, is met, then the step of executing the number Nm of instructions at a location corresponding to the specified execution condition ECm is performed.

What is claimed is:

1. A system for controlling the execution of a program in an information processor for processing instructions by pipelining, the system comprising:

means for providing a set of instructions including an execution control instruction, the execution control instruction containing a condition field and an instruction-specifying field, the condition field containing, in binary code, an execution condition, the instruction-specifying field containing, in binary code, the number of instructions to be executed only if said execution condition is satisfied;

means for deciding, based on the results of operations performed in response to one or more instructions preceding the execution control instruction currently being executed, whether or not the execution condition that has been contained in the condition field of the execution control instruction is satisfied; and means for determining based on the outcome of the decision whether or not said number of instructions, which number has been contained by the instruction-specifying field as the number of instructions succeeding the execution control instruction, should be nullified.

2. The system of claim 1, further comprising a plurality of flag registers for holding multiple flags which correspond to the results of operations performed in response to one or more instructions preceding the execution control instruction currently being executed, wherein the means for deciding whether or not the execution condition is satisfied is determined by comparing the execution condition field to control flags which are determined based on the multiple flags, wherein the bit number of the execution condition and the control flags equals N, wherein N equals two or more.

3. A method for controlling the execution of a program in an information processor for processing instructs by pipelining, the method comprising the steps of:

a) providing a set of instructions including an execution control instruction, the execution control instruction containing a condition field and an instruction-specifying field, the condition field containing, in binary code, an execution condition, the instruction-specifying field containing, in binary code, the number of instructions to be executed only if said execution condition is satisfied;

b) deciding, based on the results of operations performed in response to one or more instructions preceding the execution control instruction currently being executed, whether or not the execution condition that has been contained in the condition field of the execution control instruction is satisfied; and c) determining based on the outcome of the decision step b) whether or not said number of instructions, which number has been contained by the instruction-specifying field as the number of instructions succeeding the execution control instruction, should be nullified.

4. The method of claim 3, wherein the condition field is a single field for specifying the execution condition, and wherein the instruction-specifying field is a single field for defining the instruction number, and wherein the step c) comprises the sub-step of regarding said number of instructions, which number has been defined by the instruction-specifying field as the number of instructions succeeding the execution control instruction, as instructions to be executed only if said execution condition is satisfied, and nullifying the conditionally executable instructions if the execution condition that has been specified by the condition field is not satisfied.

5. The method of claim 4, wherein the step c) further comprises the sub-step of executing the conditionally executable instructions if the execution condition that has been specified by the condition field is satisfied.

6. The method of claim 3, wherein the condition field is a single field for specifying the execution condition, and wherein the instruction-specifying field is a single field for defining the instruction number, and wherein the step c) comprises the sub-steps of:

regarding said number of instructions, which number has been defined by the instruction-specifying field as a number of instructions succeeding the execution control instruction, as a first set of conditionally executable instructions, and nullifying the first set of conditionally executable instructions if the execution condition that has been specified by the condition field is not satisfied; and regarding said number of instructions, which number has been defined by the instruction-specifying field as the number of instructions succeeding the first set of conditionally executable instructions, as a second set of conditionally executable instructions, and nullifying the second set of conditionally executable instructions if the execution condition that has been specified by the condition field is satisfied.

7. The method of claim 6, wherein the step c) further comprises the sub-steps of:

getting the first set of conditionally executable instructions executed if the execution condition that has been specified by the condition field is satisfied; and getting the second set of conditionally executable instructions executed if the execution condition that has been specified by the condition field is not satisfied.

8. The method of claim 3, wherein the condition field is a single field for specifying the execution condition, and wherein the instruction-specifying field contains first and second instruction-specifying sub-fields, which respectively define, in binary code, first and second numbers of instructions to be executed only conditionally, and wherein the step c) comprises the sub-steps of:

regarding the first number of instructions, which number has been defined by the first instruction-specifying sub-field as the number of instructions succeeding the execution control instruction, as a first set of conditionally executable instructions, and nullifying the first set of conditionally executable instructions if the execution condition specified by the condition field is not satisfied; and regarding the second number of instructions, which number has been defined by the second instruction-specifying sub-field as the number of instructions succeeding the first set of conditionally executable instructions, as a second set of conditionally executable instructions, and nullifying the second set of conditionally executable instructions if the execution condition specified by the condition field is satisfied.

9. The method of claim 8, wherein the step c) further comprises the sub-steps of:

getting the first set of conditionally executable instructions executed if the execution condition that has been specified by the condition field is satisfied; and getting the second set of conditionally executable instructions executed if the execution condition that has been specified by the condition field is not satisfied.

10. The method of claim 3, wherein the condition field includes multiple condition sub-fields, each specifying a single associated execution condition, and wherein the instruction-specifying field is a single field for defining the instruction number, and wherein the step c) comprises a plurality of sub-steps, and wherein in each said sub-step, said number of instructions, which number has been defined by the instruction-specifying field as the number of instructions succeeding the execution control instruction, are regarded as conditionally executable instructions, and, if the execution condition specified by an associated one of the condition sub-fields is not satisfied, the conditionally executable instructions at a location corresponding to the execution condition specified are nullified.

11. The method of claim 10, wherein the step c) comprises a plurality of sub-steps, wherein in each said sub-step, if the execution condition specified by an associated one of the condition sub-fields is satisfied, the conditionally executable instructions at a location corresponding to the execution condition specified are executed.

12. The method of claim 3, wherein the condition field includes multiple condition sub-fields, each specifying a single execution condition, and wherein the instruction-specifying field includes multiple instruction-specifying sub-fields corresponding to the respective condition sub-fields, each said instruction-specifying sub-field defining an associated instruction number in binary code, and wherein the step c) comprises a plurality of sub-steps, and wherein in each said sub-step, said number of instructions, which number has been defined by an associated one of the instruction-specifying sub-fields as the number of instructions succeeding the execution control instruction, are regarded as conditionally executable instructions, and, if the execution condition specified by associated one of the condition sub-fields is not satisfied, the conditionally executable instructions at a location corresponding to the execution condition specified are nullified.

13. The method of claim 12, wherein the step c) comprises a plurality of sub-steps, wherein in each said sub-step, if the execution condition specified by an associated one of the condition sub-fields is satisfied, the conditionally executable instructions at the location corresponding to the execution condition specified are executed.

14. The method of claim 3, wherein the information processor comprises a plurality of flag registers for holding multiple flags which correspond to the results of operations performed in response to one or more instructions preceding the execution control instruction currently being executed, wherein deciding, in the step b), whether or not the execution condition is satisfied by comparing the execution condition field to control flags which are determined based on the multiple flags, wherein the bit number of the execution condition and the control flags equals N, wherein N equals two or more.

\* \* \* \* \*